F. A. SEBRING & F. STROBL.
POTTERY MOLD.
APPLICATION FILED JAN. 18, 1917.

1,238,347. Patented Aug. 28, 1917.

Witness

Inventor
Frank A. Sebring
and Frank Strobl
By F. W. Bond, Attorney

UNITED STATES PATENT OFFICE.

FRANK A. SEBRING AND FRANK STROBL, OF SEBRING, OHIO.

POTTERY-MOLD.

1,238,347.

Specification of Letters Patent.

Patented Aug. 28, 1917.

Application filed January 18, 1917. Serial No. 143,051.

*To all whom it may concern:*

Be it known that we, FRANK A. SEBRING and FRANK STROBL, citizens of the United States, residing at Sebring, in the county of Mahoning and State of Ohio, have invented a new and useful Pottery-Mold, of which the following is a specification.

The present invention relates to improvements in pottery molds and has more especial reference to the class of molds used in casting pottery by the fluid clay or slip process.

The object of the invention is to provide a mold of the character referred to which is composed of a durable material and lined with a suitable porous material such as plaster of Paris or the like.

A further object is to provide a mold of this character which will be inexpensive to manufacture and maintain and durable and efficient in use.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims without departing from the spirit or sacrificing any of the advantages of the invention.

In the accompanying drawings.

Similar numerals of reference indicate corresponding parts throughout the several figures of the drawings.

Figure 1:
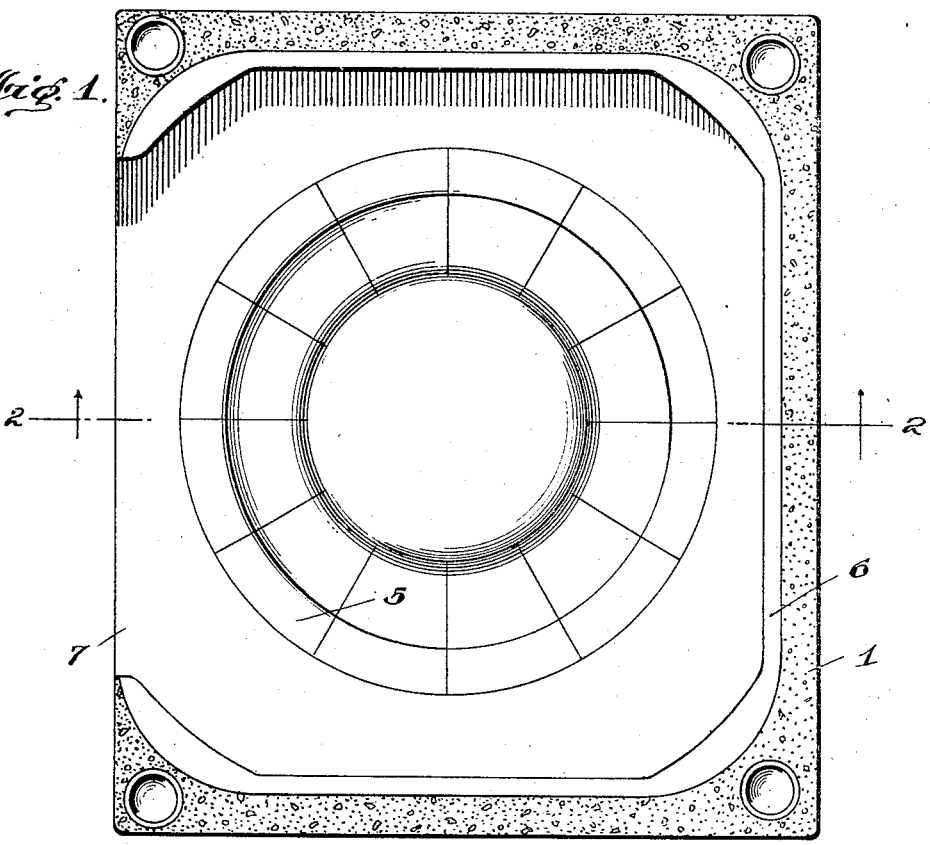
Figure 1 is a top plan view of a mold constructed in accordance with the present invention.

This mold relates more especially to the fluid clay or slip process such as is employed in molding dishes, plates, cups and the like. It is, of course, understood that molds of this character are left open upon their upper sides in order that the slip may be poured into the mold filling the same, and as these molds, like all others used in pottery, are formed of plaster of Paris, they are very absorbent, hence the water contained in the slip is drawn into the walls of the mold and the clay thus rejected is deposited in an even coating over the entire interior of the mold. Time allows this coating to accumulate and when it has reached the proper thickness the remainder of the slip is poured out of the mold leaving the hollow molded article within the mold.

In the past it has been customary to form each mold, or where the mold is divided into sections each mold section, of plaster of Paris, but since it is necessary to use in the fluid clay or slip certain chemicals which have a corroding or wearing effect upon the plaster of Paris the molds become so worn in a short space of time that they become useless and it is necessary to be continually replacing the old and worn molds with new ones. In the present invention the body of the mold is formed of cement, plaster, bisque, metal or other suitable material, it being preferable however, to use a porous material which will absorb the water from the slip the same as is done by the plaster of Paris. This base of cement or other material is lined with a thin lining of plaster of Paris or the like, which carries the imprint of the article desired to be molded. Thus when the plaster of Paris lining of a mold has become worn it is removed from the mold and a new lining substituted within the cement base, dispensing with the necessity of replacing the entire mold whenever the molding surface thereof has become worn.

Referring more especially to the construction illustrated in the accompanying drawings, the numeral 1 indicates generally the block or base of a mold, which is formed of cement, plaster, bisque, metal or other suitable material, it being preferable however, to form the base or block of porous material which will absorb water. A cavity 2 of substantially the form of the article to be molded is formed within the block or base 1, a short vertical wall 3 extending upwardly around three sides of said cavity, an aperture 4 extending from the lower edge of the cavity 2 through the lower bottom of the block or base.

Figure 2:
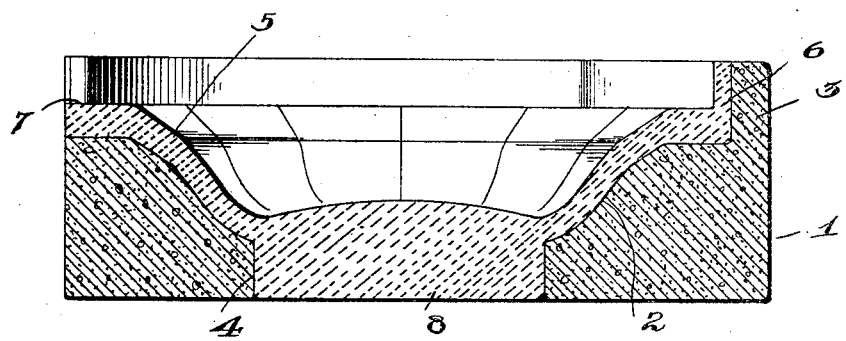
Fig. 2 is a section on the line 2—2, Fig. 1.

The lining 5 is composed of plaster of Paris or the like and as best illustrated in Fig. 2 of the drawings is comparatively thin, said lining being so shaped as to fit snugly within the cavity 2, walls 6 extending upwardly around three sides of the lining, the fourth side being left open as indicated at 7 to allow the slip to be poured from the mold after the article has been cast within the mold. A boss 8 is provided upon the lower side of the lining 5 and arranged to fit within the aperture 4 within the base. When the lining has been used sufficiently to become worn by the effect of the slip, it may be removed from the block 1 by exerting pressure upon the boss 8 raising the lining out of the cavity in the mold after which a new lining may be quickly and easily placed within the base or block. By forming the base or block of porous material the base as well as the lining of the mold will absorb a portion of the water from the slip, thus quickening each molding operation.

We claim:

1. A pottery mold of the character described comprising a base having a cavity therein and a thin lining of plaster of Paris located within said cavity, and provided with a molding surface.

2. A pottery mold of the character described, comprising a base having a cavity therein and an aperture extending from said cavity through one side of the base, a thin lining of plaster of Paris located within said cavity and provided with a molding surface and a boss formed upon said lining and extending through the aperture in the base.

3. A pottery mold of the character described, comprising a base having a cavity therein and a thin lining of plaster of Paris located within said cavity and provided with a molding surface, said lining being provided with upstanding walls around a portion of its boundary.

4. A pottery mold of the character described comprising a base of porous material having a cavity therein and a thin lining of plaster of Paris located within said cavity and provided with a molding surface.

In testimony that we claim the above, we have hereunto subscribed our names.

FRANK A. SEBRING.
FRANK STROBL.

Copies of this patent may be obtained for five cents each, by addressing the "Commissioner of Patents, Washington, D. C."